July 9, 1968

M. HODAS 3,391,947

BELLY-WHOPPING SLED

Filed Jan. 4, 1967

INVENTOR.
MARTIN HODAS

BY

Leonard H. King
ATTORNEY.

United States Patent Office 3,391,947
Patented July 9, 1968

3,391,947
BELLY-WHOPPING SLED
Martin Hodas, 118 King St., Malverne, N.Y. 11565
Filed Jan. 4, 1967, Ser. No. 607,204
3 Claims. (Cl. 280—87.03)

ABSTRACT OF THE DISCLOSURE

A roller sled suitable for "belly-whopping" and employing a spring-mounted running gear and fifth wheel steering assembly.

BACKGROUND OF THE INVENTION

Field of the invention

Occupant-steered wheeled sled to provide a cushioning and anti-tipping effect, particularly when the roller sled hits the ground with the rider thereon after a running start.

Description of the prior art

Coaster wagons have long been known and used for pulling children along the ground or for coasting down a slope. Generally speaking, they are comprised of a substantially flat, elongated body member having wheels at each of the four corners and means coupled to the front wheels for steering the sled. Some versions of the prior art wagons also have shock-absorbing means in the form of compression springs. The conventional wagon was perfectly acceptable when pulled slowly in a straight path. However, if sharp turns were made suddenly it easily became unbalanced and tended to tip over, thus causing the occupant to fall out. Such actions frequently resulted in injury to the rider. Moreover, the prior art devices are not suited for the ancient art of "belly-whopping." When this sport is practiced on snow there is a cushioning effect of the snow; however, when practiced on hard pavement, shock-absorbing devices are required. For example, prior art patents, U.S. Nos. 2,467,932 and 3,069,182 show no shock-absorbing means, while U.S. Patent No. 3,035,849 shows shock-absorbing means in the rear but not in the front which receives the full impact of the load.

The present invention, by means of a novel, spring-mounted wheel and steering arrangement, overcomes the inherent instability of the prior art. In so doing, increased utility is imparted making a very old toy useful for other purposes. The structure of this invention may be used for "belly-whopping" in much the same manner as a sled with runners is used in snow. There is no danger of tipping over and this is a very important consideration since the user will be running fast, the sled will hit the ground at a high rate of speed and the device will normally be used on a hard surface such as concrete. Without the present structure, a child could not safely "belly-whop" on anything but a relatively soft surface such as snow.

SUMMARY OF THE INVENTION

As will be described more fully hereinafter, the present invention provides an enlarged bearing surface that is integral and movable together with the front, steerable axle. Spring means, extending downwardly from the underside of the body or the sled, in the vicinity of each forward wheel, are maintained in engagement with the enlarged bearing surface. Thus, regardless of the position of the front wheels, the body of the sled is resiliently supported and the tipping possibility thereof is minimized. In addition, the springs serve to cushion the inital shock of the wheels hitting the solid ground.

Additional shock absorbing springs are provided for the rear axle. Further, the steering means for the front axle are outboard of the body of the sled, thus precluding the possibility of injury when the user falls onto the sled. In keeping with the safe aspects of this invention, means are also provided for maintaining the front steering wheels in a normally forward directing position. Thus, when the sled first hits the ground it will go forward in its original direction. The steering means may then be used to change direction as desired.

Accordingly, it is an object of this invention to provide a roller sled having an improved wheel mounting and steering arrangement.

It is another object of this invention to provide a roller sled having stabilizing means for the front wheels thereof.

A particular object of this invention is to provide an improved spring-mounted axle arrangement whereby the body of the sled is maintained substantially level regardless of the position of the front steering wheels.

A specific object of this inventon is to provide means for maintaining shock-absorbing springs in contact with the front axle of the roller sled regardless of the position of the front wheels thereof.

These and other features, objects and advantages of the invention will, in part, be pointed out with particularity and will, in part, become obvious from the following more detailed description of the invention taken in conjunction with the accompanying drawing which forms an integral part thereof.

BRIEF DESCRIPTION OF THE DRAWING

In the various figures of the drawing like reference characters designate like parts.

In the drawing.

DESCRIPTION OF THE PREFERRED EMBODIMENTS

Figure 1:
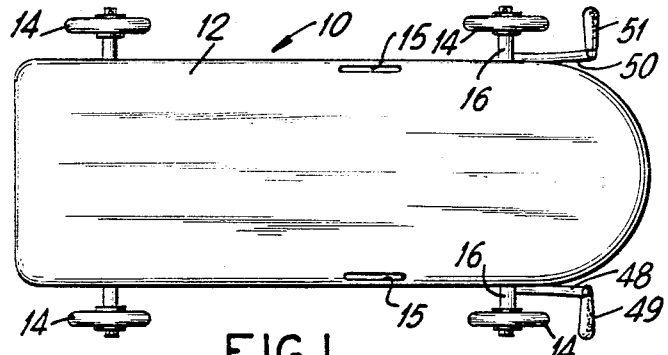
FIG. 1 is a plan view of my new roller sled.
Figure 5:
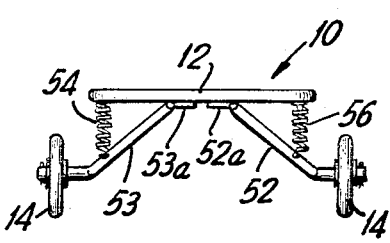
FIG. 5 is a rear elevational view of the sled with certain parts omitted for clarity.
Figure 2:
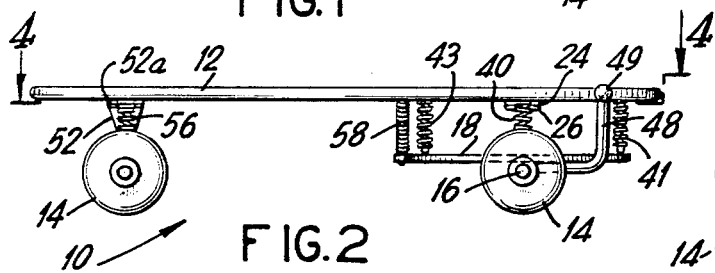
FIG. 2 is a side elevational view of the roller sled.

Referring now to FIGS. 1-4, it will be seen that roller sled 10 is comprised of a flat, elongated body portion 12 that is substantially rectangular in area. Hand grips 15 comprising an opening in the top deck near the edge permits the user to grip the sled. The body portion may be fabricated of wood, metal or any other material that is sufficiently rigid and workable such as a high impact plastic. The body of course may be fabricated in different lengths and widths to accommodate children of different sizes.

The forward end of the roller sled is provided with a novel shock-absorbing steering arrangement. Forward wheels 14 are rotatably mounted on laterally extending, opposed stub shafts 16 which are, in turn, rigidly secured to the periphery of a fifth wheel member 18. Fifth wheel member 18 is a substantial metal plate which is provided with a bore 20 which slides on shaft 22. Shaft 22 is secured to the bottom of body 12 by means of a flange 24. Also mounted on shaft 22 there is provided a simple thrust bearing 26 and a flange 28. The flange 28 is provided with a hub 30 which slides in a close fit on shaft 22. A spring 32 is placed in compression between thrust bearing 26 and flange 28. Member 18 is maintained captive on shaft 22 by means of washer 34 and cotter pin 36. Extending from body 12 there are provided a pair of springs 40, 41, 42 and 43, which are equipped at their lower end with guide devices 44. The glides may be metal, nylon, or other low friction material, and could even be a rollable member. Springs 41 and 43 on the longitudinal axis of the sled serve to stabilize the assembly. Instead of four springs, three springs 120° apart may be used. If the 41–43 springs are of sufficient capacity, spring 32 may be dispensed with.

As the user falls down onto the sled, springs 32, 40 and 42 act in unison to absorb the shock. If the user wishes to bank he can lean, causing either spring 40 and 42 to become depressed. Extending from the bottom of member 14 there are provided a pair of arms 48 and 50 which terminate in handles 49 and 51, which provide means for steering the sled. It will be noted that this construction avoids having a handle in the path of the person dropping down to the sled. Ii will be appreciated that, as spring 32 is compressed, shaft 22 will extend downwardly. A feature of the invention is that with the wheels turned, springs 40 and 42 act against member 18 to maintain stability.

Figure 6:
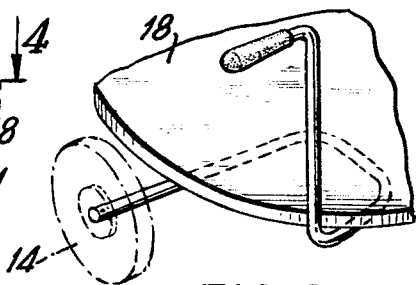
FIG. 6 is a pictorial view of an axle handlebar assembly.
Figure 3:
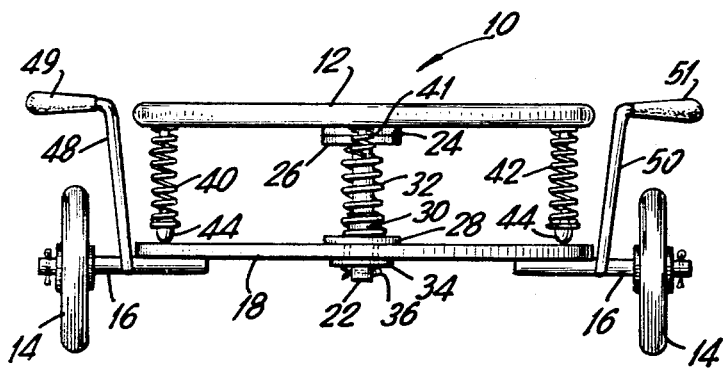
FIG. 3 is a front elevational view of the roller sled with certain parts omitted for clarity.
Figure 4:
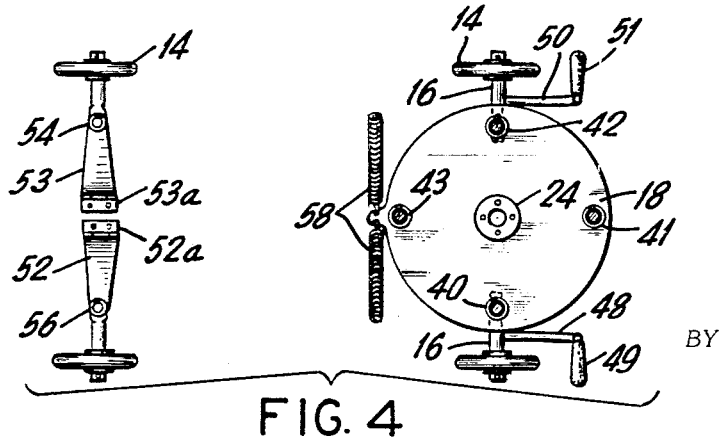
FIG. 4 is a section taken in plan along lines 4—4 of FIG. 2.

The rear wheels are also mounted on independent pivoted arms 52 and 53 which are provided with shock-absorbing springs 54 and 56, respectively. As shown in FIGS. 4 and 6, the arms 52 and 53 are pivoted from hinge plates 52a and 53a. The plates 52a and 53a are secured to the bottom of the body 12. It will be appreciated that plates 50a and 52a can in practice be a single plate.

FIG. 6 shows an axle and handle assembly which is made in one piece and welded to the fifth wheel 18 (shown in phantom). It will be appreciated that other constructions can be employed without departing from the spirit of the invention.

The vertical portions of the handles 49, 51, intersect the sled body 18 to limit the turning of the steering wheels. It is to be appreciated that the spacing between the arms may be varied to achieve any desired turning radius. Other stop arrangements may be substituted.

Figure 7:
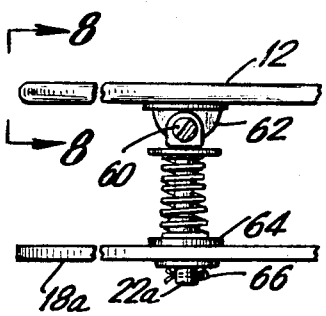
FIG. 7 is a front elevation of the sled showing an alternative construction.
Figure 8:
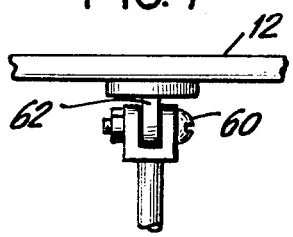
FIG. 8 is a side elevation taken along line 8—8 of FIG. 7.

An alternative mounting arrangement with the fifth wheel is shown in FIGS. 7 and 8, where shaft 22a terminates in a yoke which is pivotally secured by pin 60 to flange member 62. The fifth wheel is attached to a sliding hub 64 which slides along shaft 22a and is rotatable thereabout by the action of the handlebars. With this embodiment, the sled is tilted and the shaft 22a will pivot together with the fifth wheel 18a. A simple cotter pin 66 and washer 68 secures the assembly.

Means are also provided for maintaining the wheels 14 in a forward direction when the sled is being carried off the ground. Transversely extending springs 58 (FIG. 4) have one end anchored in the underside of the body portion proximate the side edges thereof. The opposite or inner ends of the springs are anchored at a common point on the disc 18 that corresponds with the longitudinal centerline of the sled. Thus the wheels are always directed forward and yet may easily be turned by angularly moving the steering handles with sufficient force to overcome the springs. The springs balance and counteract each other.

The apparatus described hereinabove permits the use of a simple roller sled for "belly-whopping" in much the same manner as a sled with runners is used on snow. The undesirable tipping action that is inherent in conventional roller sleds is eliminated by the use of the front springs that continuously exert a force on the surfaces in contact with the ends thereof. The enlarged surface on which the front springs bear assures that the body portion of the sled will be resiliently supported regardless of the angular direction of the front wheels. Also, in order to further reduce the likelihood of tipping, the rear wheels are resiliently mounted.

Various modifications may be added; for example, a front protective shield of metal or plastic could be provided. If desired, the deck may be covered with a shock-absorbent foam cushion. A more elaborate vehicle can be provided with pneumatic or hydraulic shock-absorbers.

Having thus disclosed the best embodiment of the invention presently contemplated, it is to be understood that various changes and modifications may be made by those skilled in the art without departing from the spirit of the invention.

What is claimed is:
1. A roller sled to be used on a hard surface, said sled comprising:
  (a) a flat, elongated body portion adapted to support the torso of the user in a reclining position;
  (b) an elongated shaft normally extending perpendicularly downwardly relative to the said body;
  (c) a fifth wheel rotatably and slidably mounted on said shaft at a vertically spaced location below said body;
  (d) at least two spaced biasing members extending between the underside of said body portion and the top side of said fifth wheel, said biasing members being arranged to continuously exert a force on the surfaces in contact therewith regardless of the angular position of said wheels with respect to the longitudinal centerline of said body portion;
  (e) steering means coupled to said fifth wheel; and
  (f) a pair of spaced wheels rollably and yieldably supported proximate the rearward end of said body portion.

2. The apparatus in accordance with claim 1 including spring means extending between said fifth wheel and said body portion, said spring means acting to maintain said wheels in a position parallel to the longitudinal axis of said body portion.

3. The apparatus in accordance with claim 1 including biasing means resiliently supporting said spaced wheels with respect to the rearward portion of said body member.

References Cited

UNITED STATES PATENTS

| | | | |
|---|---|---|---|
| 1,341,768 | 6/1920 | Watson. | |
| 2,014,060 | 9/1935 | Albrecht | 280—87.03 X |
| 2,531,933 | 11/1950 | Clark | 280—87.03 X |
| 3,035,849 | 5/1962 | Groth | 280—87.03 X |
| 3,143,359 | 8/1964 | Dupuis | 280—87.03 |

LEO FRIAGLIA, *Primary Examiner.*